United States Patent [19]

Strenger

[11] Patent Number: 4,915,261
[45] Date of Patent: * Apr. 10, 1990

[54] BEVERAGE DISPENSING SYSTEM

[75] Inventor: Marshall C. Strenger, Lake Forest, Ill.

[73] Assignee: Hays MacFarland & Associates, Glen Ellyn, Ill.

[*] Notice: The portion of the term of this patent subsequent to Jul. 26, 2005 has been disclaimed.

[21] Appl. No.: 296,665

[22] Filed: Jan. 13, 1989

Related U.S. Application Data

[60] Division of Ser. No. 14,927, Feb. 13, 1987, Pat. No. 4,808,346, which is a continuation-in-part of Ser. No. 724,944, Apr. 28, 1985, abandoned, which is a continuation of Ser. No. 453,148, Dec. 27, 1982, abandoned, which is a continuation of Ser. No. 309,834, Oct. 8, 1981, abandoned, which is a continuation of Ser. No. 578,169, May 16, 1975, abandoned, which is a continuation-in-part of Ser. No. 482,981, Jun. 25, 1974, abandoned, which is a continuation of Ser. No. 273,509, Jul. 20, 1972, abandoned.

[51] Int. Cl.$^4$ ...................... B65D 35/02; B65D 35/28
[52] U.S. Cl. ...................................... 222/92; 222/94; 222/107; 222/541
[58] Field of Search ............ 222/92, 107, 129.1–129.4, 222/94, 541

[56] References Cited

U.S. PATENT DOCUMENTS

4,163,510  8/1979  Strenger ........................... 222/129.2
4,759,472  7/1988  Strenger ............................... 222/92

Primary Examiner—Kevin P. Shaver
Assistant Examiner—Steven M. Reiss
Attorney, Agent, or Firm—Leydig, Voit & Mayer

[57] ABSTRACT

A carbonated beverage dispensing system for dispensing a mixed beverage consisting of a flavoring constituent contained in an individual serving packet and a base liquid. The dispensing system includes an actuating unit having a platen that is movable between a retracted position in which a flavoring constituent containing packet is positionable into the actuating unit with a rupturable discharge end thereof directed downwardly and an actuated position which progressively presses against a side of the packet for forcing the contents of the packet in a downward direction for rupturing the discharge end of the packet and for expelling the contents thereof into a discharge nozzle. A carbonated water supply is provided for simultaneously dispensing a predetermined quantity of carbonated water into the nozzle for mixing with the expelled flavoring constituent prior to discharging therefrom. The carbonated water supply is adapted for substantially instantaneously carbonating fresh water as it is being dispensed to the mixing nozzle.

16 Claims, 6 Drawing Sheets

BEVERAGE DISPENSING SYSTEM

RELATED APPLICATIONS

This application is a division of Ser. No. 014,927, filed Feb. 13, 1987 and now U.S. Pat. No. 4,808,346, patented Feb. 28, 1989, which is a continuation-in-part of U.S. patent application Ser. No. 724,944, filed Apr. 28, 1985, entitled "Instantaneous Carbonator Method and Apparatus", now abandoned, which is a continuation of application Ser. No. 453,148 filed Dec. 27, 1982, now abandoned, which is a continuation of application Ser. No. 309,834 filed Oct. 8, 1981, now abandoned, which in turn is a continuation of U.S. application Ser. No. 578,169 filed May 16, 1975, now abandoned, which in turn is a continuation-in-part of application Ser. No. 482,981, filed June 25, 1974, now abandoned, which is a continuation of applicant's earlier co-pending U.S. patent application Ser. No. 273,509, filed July 20, 1972, now abandoned.

A related application is application Ser. No. 014,622, entitled "Container Having a Pressure Rupturable Seal for Dispensing Contents", filed simultaneously with the present application and now U.S. Pat. No. 4,759,472.

BACKGROUND OF THE INVENTION

The present invention relates to a method and apparatus for mixing and directly dispensing beverages consisting of a measured quantity of a base liquid, such as carbonated water, and a measured quantity of a flavoring constituent, such as syrup used in making carbonated soft drinks.

Carbonated beverage dispensers have long been available which permit the selection and dispensing of one of a plurality of flavors of beverages directly into a serving cup. Such dispensers, sometimes are referred to as "post-mix" dispensing systems, typically require large containers of the various syrups to be used as the flavoring constituents. The syrup containers, which must be refilled or replaced on a regular basis, are both messy to handle and create sanitary problems. Since each container must be independently coupled to the discharge location of the dispenser with separate control valving, such beverage dispenser systems are bulky in size, duplicative and complex in construction, and expensive to maintain. Hence, such systems primarily have been employed in relatively high use commercial establishments.

To alleviate some of the problems of such post-mix beverage dispensing systems, a system has been proposed which utilizes flavoring constituents sealed in individual serving packets, which are individually placed into the dispenser for automatic release of the contents therein when the dispenser is activated to serve a drink. Such system is disclosed in my U.S. Pat. No. 4,163,510. This system permits the selection of a variety of flavoring constituents without the duplication and complexity of equipment often required by many conventional post-mix carbonated beverage dispensers. In such packet type beverage dispensing systems, however, problems can arise if the packet is not properly positioned in the dispenser. Problems also can occur in effecting reliable opening of the packets without uncontrolled bursting, and in directing the contents from the packet in a manner that achieves thorough mixing of the syrup in the dispensed drink without excessive foaming.

Indeed, excessive foaming and inadequate mixing of the carbonated water and flavoring syrup are problems that have long plagued post-mix type of carbonated beverage dispensing systems. If the dispensed drink has a high degree of carbonation and is forcibly dispensed into the cup or receptacle, foaming can cause the drink to overflow the cup, resulting in only a partially filled cup. On the other hand, if the degree of carbonation is reduced, this frequently results in a less desirable beverage. Moreover, if the carbonated water and the flavoring constituent are not thoroughly mixed during dispensing, an undesirable drink also will result, with a portion being essentially carbonated water and a portion being substantially undiluted syrup. The quality of the drink can also be adversely affected by contamination within the dispenser from a previously dispensed drink of a different flavor.

A further problem of post-mix type of carbonated beverage dispensing systems has concerned the supply of carbonated water and the expense associated therewith. Carbonated water in post-mix beverage dispensing systems commonly has been provided through relatively complicated systems, often employing constant recirculation of water and carbon dioxide over a substantial period of time in large carbonation tanks. Once the water is carbonated, the supply must be stored under pressure within such carbonation tank, which usually is contained within the dispensing apparatus. In larger commercial establishments, the carbonation tank may be located remotely from the dispenser, connected by insulated lines. In either case, the carbonation tanks are expensive and costly to operate, and when contained within the dispenser, add significantly to the space requirements for the dispensing system. Since the carbonation tanks are maintained in a pressurized condition, problems also can occur in controlling the water level, which in some instances require electrical relays and separate pumps for refilling and circulating the water.

It is an object of the present invention to provide a carbonated beverage dispensing system that is compact in design, simple to install, and lends itself to more economical use.

Another object is to provide a beverage dispensing system which utilizes individual serving packets of flavoring constituents and is adapted for reliably dispensing highly carbonated and thoroughly mixed drinks. A related object is to provide such a system that is operable to reliably rupture the flavor constituent containing packet and direct the contents in a controlled manner which permits thorough mixing thereof with simultaneously dispensed carbonated water.

A further object is to provide a carbonated beverage dispensing system of the above kind which is adapted to selectively dispense individual drinks of a plurality of different flavors without flavor contamination from a previously dispensed drink.

Still another object is to provide a packet type of beverage dispensing system which includes fail safe means for ensuring that the flavor constituent containing packet is properly positioned within the dispensing apparatus prior to operation.

Yet a further object is to provide a packet type of beverage dispensing system with means for positively retaining the packet in position during dispensing so as to ensure proper direction of the discharge of contents from the packet.

Another object is to provide a carbonated beverage dispensing system of the above kind which eliminates necessity for bulky carbonation tanks or the need for storing a supply of carbonated water under pressure. A related object is to provide such a beverage dispensing system that is operable to substantially instantaneously carbonate water as it is being directed through the dispensing system.

Still another object is to provide a carbonated beverage dispensing system of the foregoing type which occupies substantially the same amount of space as an ordinary bottled water unit and is economical for home or small business usage.

BRIEF DESCRIPTION OF THE DRAWINGS

Other objects and advantages of the invention will be more readily apparent upon reading the following description of a preferred embodiment of the invention and upon reference to the accompanying drawings wherein.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE DRAWINGS

Figures 1, 2, 3:
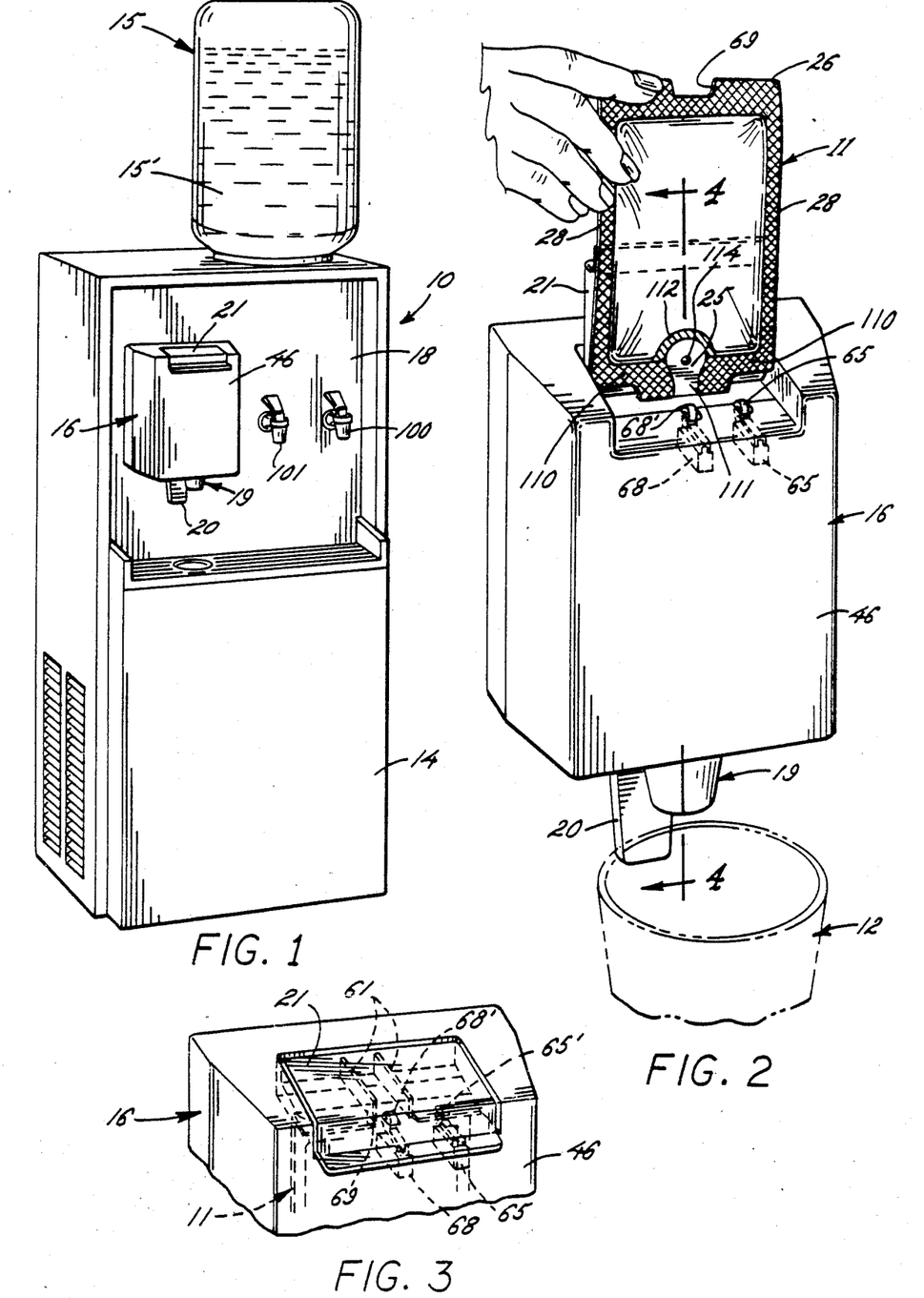
FIG. 1 is a perspective of an illustrated beverage dispensing system embodying the present invention.
FIG. 2 is an enlarged perspective showing a flavor constituent containing packet being inserted into the packet actuating unit of the illustrated dispenser system.
FIG. 3 is an enlarged perspective illustrating the switching mechanisms for ensuring that the packet is properly positioned in the actuating unit before activation of the system.
Figure 19:
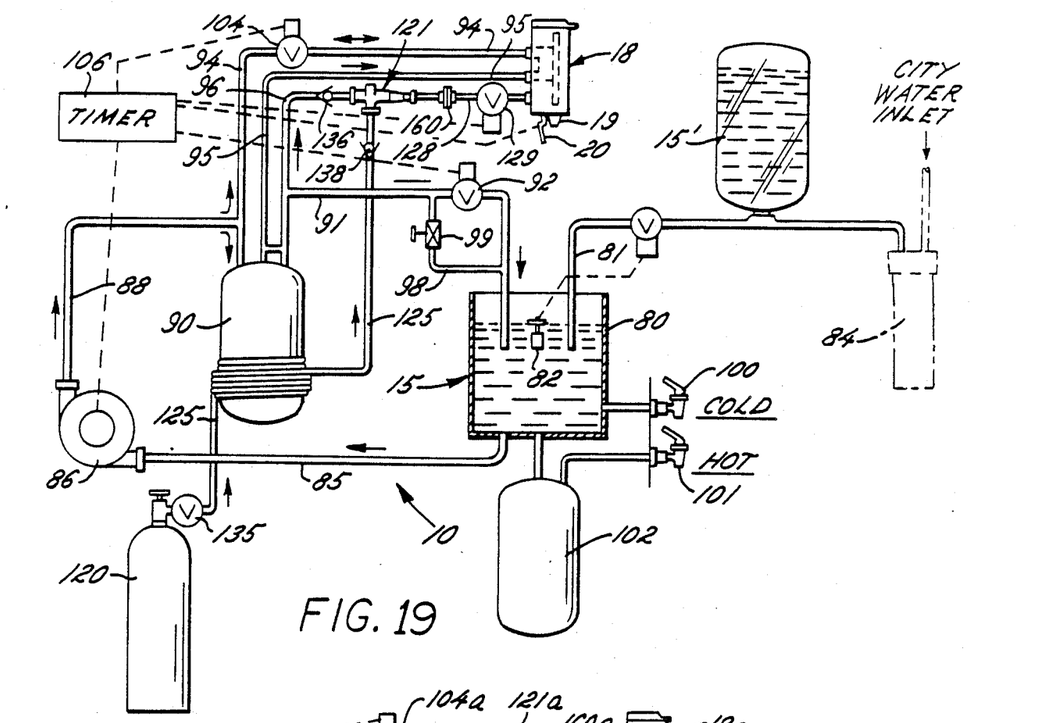
FIG. 19 is a flow diagram of the illustrated beverage dispensing system.

Referring now to the drawings, and particularly FIGS. 1, 2 and 19, there is shown an illustrative beverage dispensing system 10 embodying the present invention which utilizes an individual serving packet 11 of a flavoring constituent in automatically dispensing a carbonated beverage into a serving cup 12. The beverage dispensing system 10 comprises a cabinet 14, a water supply 15, which in this case includes a water tank 15' mounted in an inverted fashion on the top of the cabinet 14 in a manner similar to a conventional bottled water dispensing unit, and a packet receiving and actuating unit 16 located on a recessed front panel 18 of the cabinet 14. The actuating unit 16 has a discharge nozzle 19 on its underside and an operating lever 20 that is actuated upon positioning of the cup 12 under the discharge nozzle 19. A door or lid 21 mounted on the top of the actuating unit 16 may be lifted to permit insertion into the actuating unit 16 of a packet 11 containing the selected flavoring constituent. The packet 11 has a weakened or rupturable discharge end 25 that is insertable in a downwardly directed fashion into the actuating unit 16 (FIG. 2). The packet 11 may be made of two layers of flexible plastic material having a sealed peripheral upper end 26 and sealed sides 28, which together with the rupturable discharge end 25, define a sealed chamber for containing a predetermined quantity of a flavoring constituent 29, such as a soft drink syrup.

Figures 12, 13:
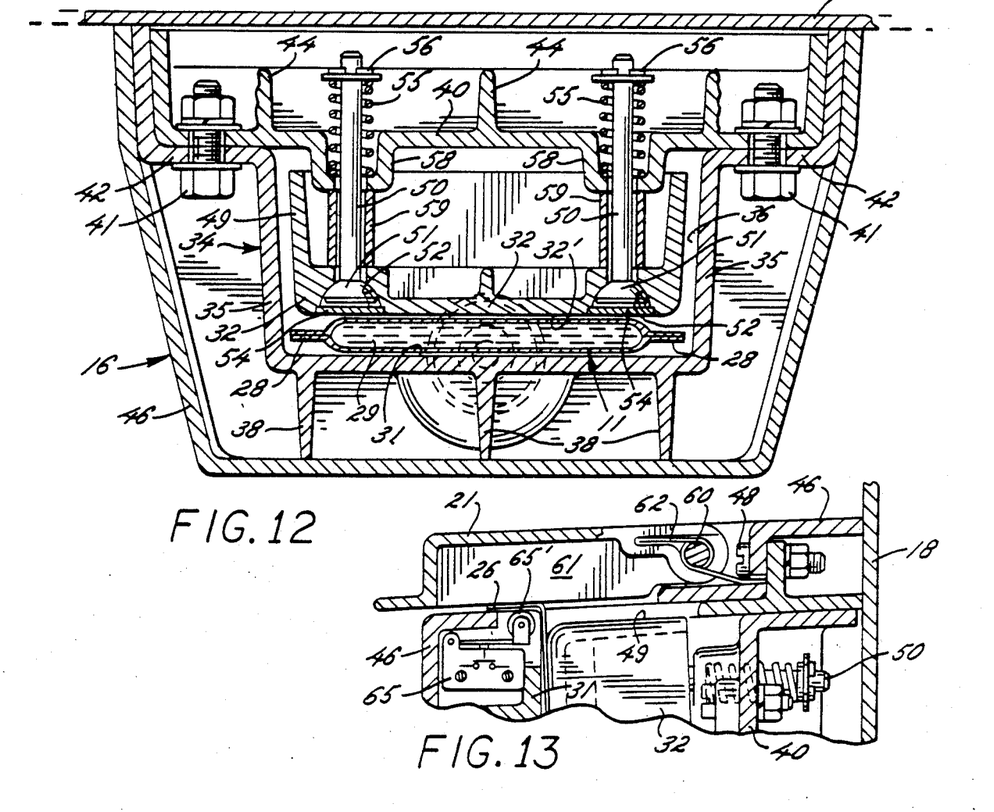
FIG. 13 is a vertical section, taken in the plane of line 13—13 in FIG. 11, showing the lid of the actuating unit in closed position with a packet properly positioned therein.

In accordance with an important aspect of the present invention, the actuating unit is operable to reliably rupture the discharge end of a flavor constituent containing packet and discharge the contents thereof in a controlled manner that permits thorough mixing of the contents into a dispensed drink. To this end, the actuating unit 16 has a packet receiving chamber 30 (FIG. 4) defined by a fixed upstanding wall 31 and a laterally movable platen 32. The fixed upstanding wall 31 in this case is an end wall of an inner housing 34, which has side walls 35 extending rearwardly of the end wall 31 for defining a rearwardly directed chamber 36 (FIG. 12). Ribs 38 extend forwardly of the end wall 31 so as to enhance the structural rigidity of the inner housing 34.

For enclosing the rear side of the chamber 36 and for providing support for the platen 32, a platen mounting plate 40 is secured to the rear side of the inner housing 34 by bolts 41 that extend through outwardly extending flanges 42 of the inner housing 34. The platen mounting plate 40 similarly is formed with ribs 44, in this case extending rearwardly of the chamber 36, for enhancing its rigidity, as best shown in FIG. 12. The inner housing 34 is secured to the front panel 18 of the cabinet 14 by bolts 45 (FIG. 11), and a rearwardly opening housing cover 46 is positioned over the inner housing 34 and secured thereto by bolts 48 (FIG. 4).

Figures 6, 7, 8:
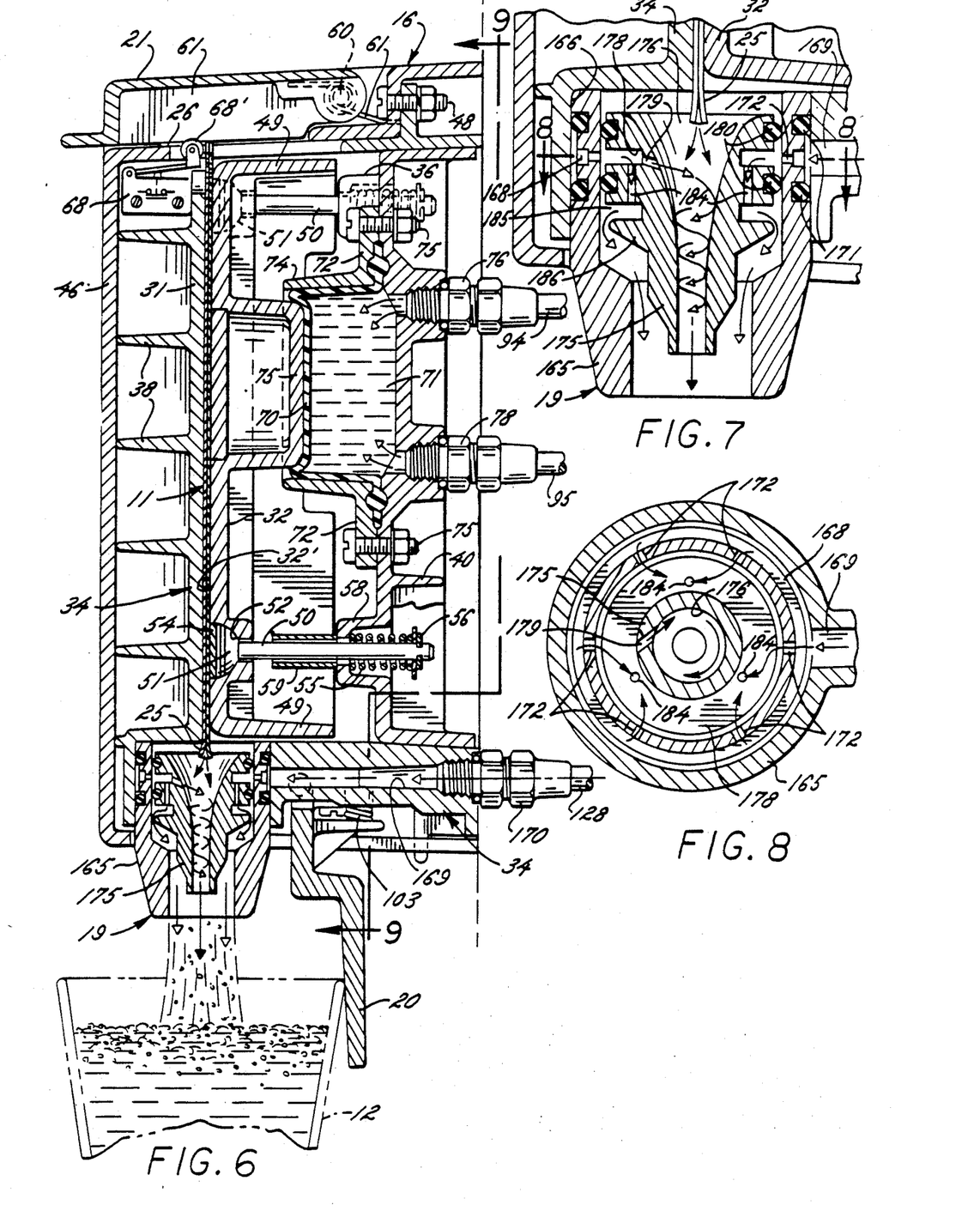
FIG. 6 is an enlarged section, similar to FIGS. 4 and 5, showing the platen in a completely actuated position with the contents of the packet fully discharged.
FIG. 7 is an enlarged section of the discharge nozzle of the illustrated dispensing system.
FIG. 8 is a horizontal section of the discharge nozzle, taken in the plane of line 8—8 in FIG. 7.

The platen 32 has a flat forwardly directed packet engaging surface 32' and rearwardly directed strengthening flanges 50 about the perimeter thereof. For supporting the platen 32 for relative lateral movement within the chamber 36, the platen 32 is mounted on the ends of rods 49 which extend rearwardly of the platen and through apertures in the platen support plate 40. The platen 32 in this instance has a rectangular configuration and four support rods 50 are provided, each being located near a corner of the platen. The forward ends of the rods 50 are provided with enlarged heads 51 having a rearwardly facing spherical seating portion that fit in respective spherical recesses 52 in the platen 32 so as to permit limited relative pivotal movement of the platen 32 relative to the support rods 50. The heads 51 are recessed below the outer packet engaging surface 32' of the platen and are covered by protective inserts 54 (FIGS. 6 and 12).

For biasing the platen 32 rearwardly toward an open or packet receiving position, a spring 55 is mounted on each support rod 50 in interposed relation between the rear side of the platen support plate 40 and a snap ring 56 affixed to the outermost end of the respective support rod 50. The illustrated platen support plate 40 has integrally formed forwardly extending cylindrical portions 58 through which a respective support rod extends. The cylindrical portions 58 further add to the structural rigidity of the platen support plate 40 and at least partially recieve a respective biasing spring 55. For limiting rearward positioning of the lower portion of the platen 32 under the action of the biasing springs 55, and thus, establishing the fully open or retracted position of the platen, as shown in FIGS. 4 and 12, a sleeve 59 is mounted on the two lower support rods 50 between the rear side of the platen 32 and the forward side of the platen support plate 40.

Figures 4, 5:
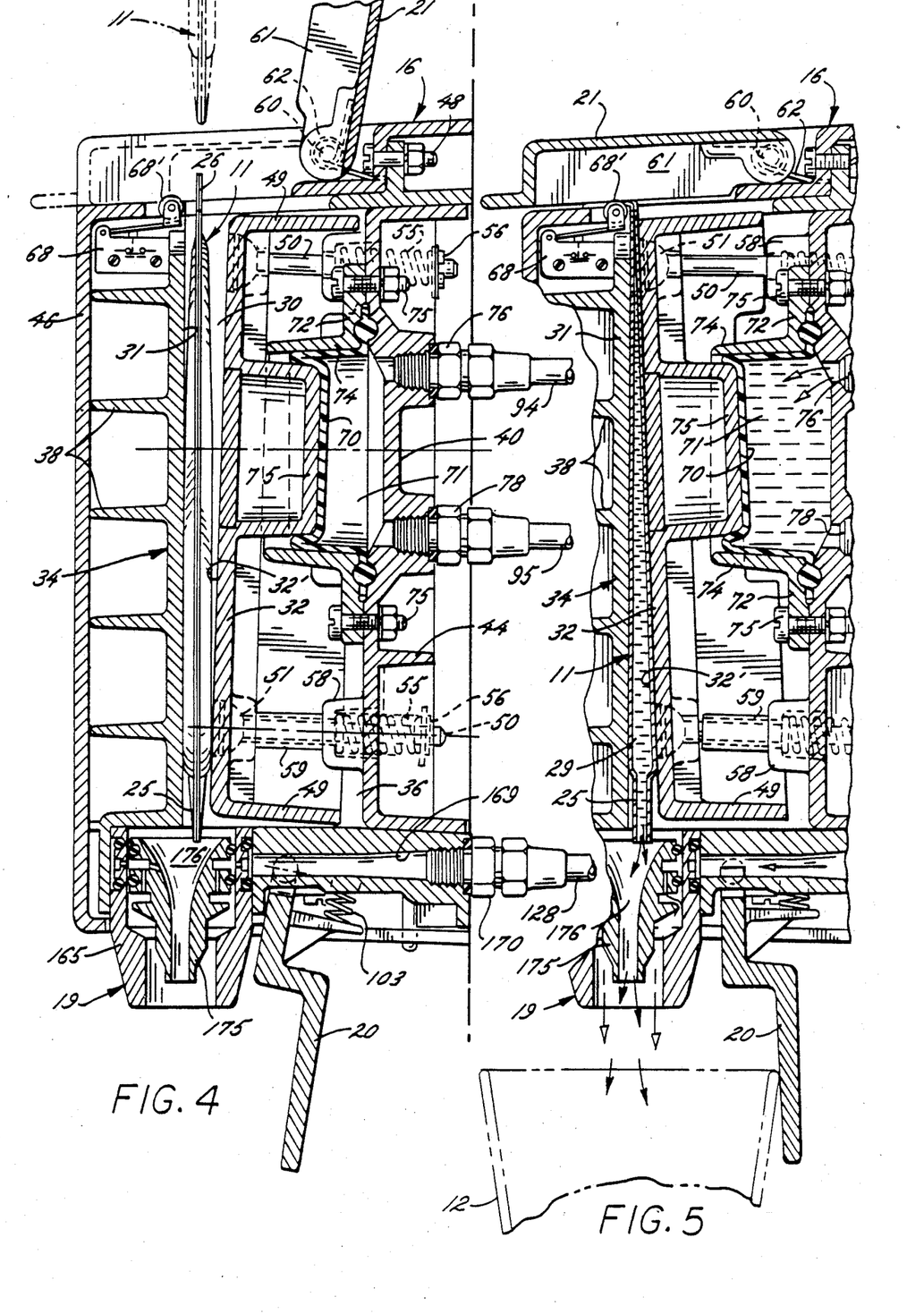
FIG. 4 is an enlarged fragmentary section, taken in the plane of line 4—4 in FIG. 2, showing the access lid of the actuating unit opened and a packet positioned therein while the actuating platen of the unit in a retracted or open position.
FIG. 5 is an enlarged fragmentary section, similar to FIG. 4, showing the lid of the actuating unit closed and the platen in a first or partially actuated position.

With the lid 21 of the actuating unit 16 lifted to its open position and the platen 32 retracted to its packet receiving position, the packet 11 is easily insertable into the chamber 30 between the fixed wall 31 and the platen 32, as shown in FIG. 4. The packet 11 preferably has a length such that upon positioning in the packet receiving chamber 30, a portion of the upper sealed end 26 of the packet extends above the top of the wall 31.

Figure 11:
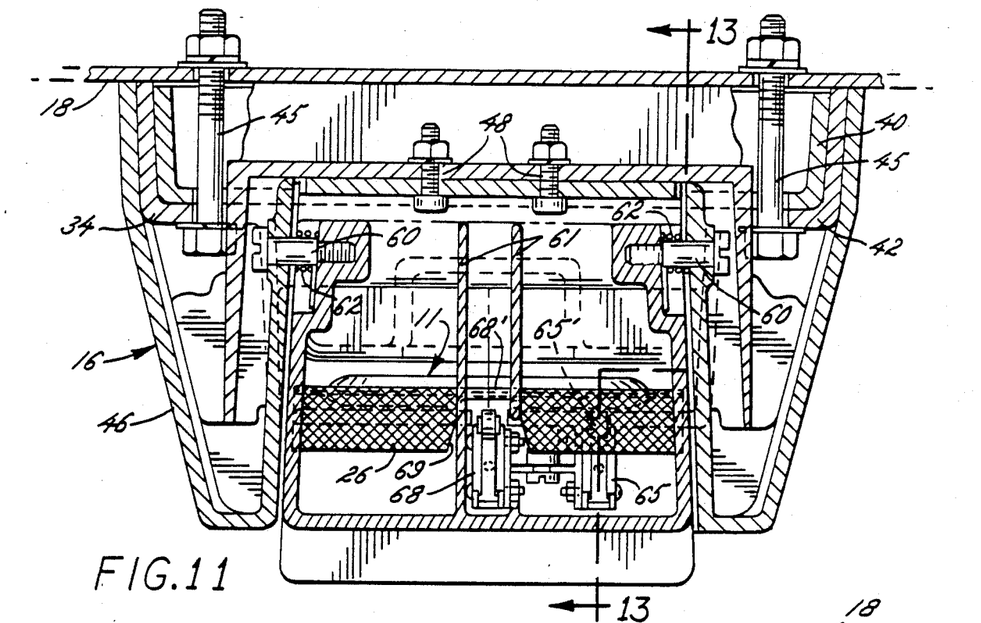
FIGS. 11 and 12 are horizontal sections of the illustrated actuating unit taken in the planes of lines 11—11 and 12—12, respectively, in FIG. 9.

In keeping with the invention, means are provided for positively engaging and retaining the upper sealed end 26 of the packet upon closure of the lid 21 and for ensuring that the packet is properly positioned in the actuating unit before a dispensing operation. The lid 21 in this instance is pivotably mounted on the housing cover 46 by pivot pins 60 secured within the housing cover 46 (FIGS. 11 and 13). The upper portion of the housing cover 46 is recessed (FIG. 2) such that upon closure of the lid 21, the lid is substantially in the upper plane of the housing cover. The lid 21 is formed with packet engaging means, which in the illustrated embodiment, comprise a pair of ribs 61 (FIG. 11) that depend from the underside of the lid in transverse relation to the plane of the end wall 31 and the upper sealed end 26 of the packet 11 positioned in the packet receiving chamber. Upon pivotal movement of the lid 21 to its closed position, as shown in FIGS. 3, 5 and 11, the ribs 61 of the lid engage the upper sealed end 26 of the packet, bend it forwardly over the top of the wall 31, and positively hold it in such position. Torsion springs 62 are provided on the pivot pins 60 for the lid for biasing the lid into such closed position so that the lid remains closed upon release thereof.

For ensuring that the lid is in closed position prior to actuation of the dispensing system 10, a normally open limit switch 65 (FIGS. 11 and 13) is mounted adjacent the top of the end wall 31 and has a spring mounted roller 65' normally disposed slightly above the end wall 31. As the upper sealed end 26 of the packet is folded over the top of the end wall 31 by the lid 21, the roller 65' is depressed, closing the switch 65 so as to permit actuation of the system, as will become apparent.

For ensuring that the packet 11 is inserted into the actuating unit 16 with the rupturable discharge end 25 directed downwardly, a second limit switch 68, in this case being normally closed, is located adjacent the top of the end wall 31 with its spring mounted roller 68' disposed slightly above the end wall. The upper sealed end 26 of the packet 11 is formed with a notch 69 (as shown in FIG. 3 and 11) which, upon proper positioning in the actuation unit, is disposed immediately adjacent the switch 68. Hence, upon closure of the lid 21 and folding of the upper sealed end 26 of the packet over the end wall 31, the notch 69 of the packet is positioned about the roller switch roller 68' so that it remains raised, leaving the switch 68 in its normally closed condition so as to permit actuation of the dispensing system 10. The packet engaging ribs 61 of the lid 21 preferably are disposed in a parallel relation such that when the lid is closed the ribs are located in close relation on opposite sides of the switch 68, thereby ensuring that the upper sealed end of the packet is firmly pressed over the end wall 31 in the area of the notch 69. In the event that the packet 11 is inadvertently inserted into the actuating unit 18 in an upside down condition with the weakened discharge end 25 at the top, upon closure of the lid 21, that portion of the packet would be folded over the end wall 31, depressing the roller 68' and opening the normally closed switch 68, preventing actuation of the system.

In keeping with the invention, means are provided for laterally moving the platen from its retracted or open position to a first position in which the platen is in inclined relation to the packet in the packet receiving chamber with the upper end of the platen engaging an upper end of the packet and then gradually pivoting the platen into progressive further engagement with the packet in a manner which squeezes the contents of the packet downwardly to effect reliable rupturing of the packet and the downward release of the contents. To this end, in the illustrated embodiment, the biasing springs 55 on the two top support rods 50 for the platen 32 are weaker in strength than the biasing springs on the support rods at the lower end of the platen, and a platen moving means, which in this case is a fluid actuated diaphragm 70, is designed for acting on the platen at a location above its vertical axis center point so that the upper springs yield more during initial movement of the platen than the lower springs. In the illustrated embodiment, the diaphragm 70 is supported forwardly of the platen support plate 40 so as to define a fluid chamber 71 therebetween at an elevation closer to the support rods 50 at the upper end of the platen 32 than those at the lower end (FIGS. 4–6). The diaphragm 70 has peripheral edge portions securely engaged between the platen support plate 40 and an outwardly extending flange portion 72 of an annular diaphragm support member 74, which is secured to the platen support plate 40 by bolts 75. The diaphragm support member 74 includes a forwardly directed cylindrical portion for supporting the sides of the diaphragm 70, and the platen 32 is formed with a rearwardly extending, cylindrical hub 75 that is received within the cylindrical portion of the diaphragm support member 74 and engaged by a central portion of the diaphragm 70. Fluid supply line fittings 76, 78, which each communicate with the chamber 71, are provided in the rear side of the platen support plate 40.

For providing a source of fluid for actuating the diaphragm 70 and for also providing a supply of a base liquid for the dispensed beverage, the water supply 15 includes a reservoir 80 that receives water from the supply tank 15' via a line 81. The water reservoir 80 may be at atmospheric pressure and a conventional float valve 82 may be provided for limiting the upper water level in the reservoir. It will be understood that alternatively the reservoir 80 could be supplied from tap water by connecting the line 81 to an outside water source 84, such as shown in phantom in FIG. 19. The reservoir 80 preferably is refrigerated in a known manner so that water contained therein may be pre-chilled to a temperature in the range of about 40°-45° F. Water in the reservoir 80 is drawn through a line 85 that communicates with a pump 86 that is operable for directing water through line 88 into a pressure tank 90. The pressure tank 90 preferably is refrigerated so as to cool the water to a temperature in the range of about 33° F. to 35° F. A return line 91 is connected between the pressure tank 90 and the reservoir 80 so as to permit circulation of the water through the system upon opening of a normally closed solenoid operated valve 92. The pressure tank 90 has three discharge or pressurized fluid supply lines 94, 95, 96, and for the purpose of permitting relatively precise adjustment of the pressure in such supply lines, a bypass line 98 having an adjustable valve 99 is connected in parallel across the valve 92 in the return line 91. In the illustrated embodiment, a cold water spigot 100 is provided in the front panel 18 of the cabinet 14 which is connected directly to the reservoir 80, and a hot water spigot 101 is similarly provided which is connected to the reservoir 80 through a heating tank 102.

Figures 9, 10:
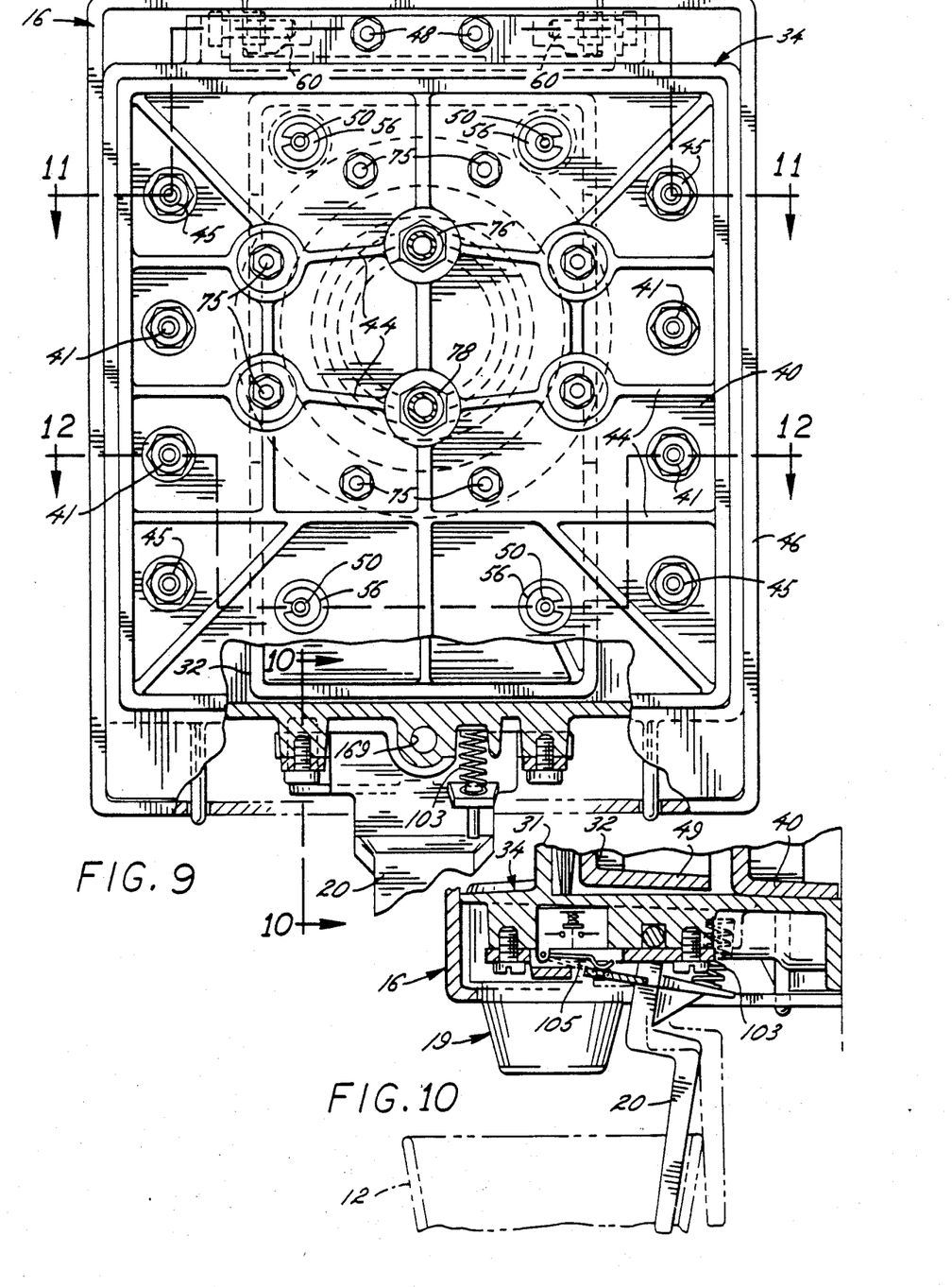
FIG. 9 is a plan view, partially in section, of the back side of the actuating unit, taken in the plane of line 9—9 in FIG. 6.
FIG. 10 is an enlarged vertical section illustrating the cup-actuated, operating lever of the illustrated system, taken in the plane of line 10—10 in FIG. 9.

In carrying out the invention, means are provided for moving the platen to its first or inclined engaging position with the packet with relatively quick action and then moving the platen from said first position to its fully actuated position with relatively slower action so as to effect a controlled discharge of liquid from the packet which permits more complete mixing in the dispensed beverage. For this purpose, the pressurized fluid supply line 94 is a relatively large diameter supply line connected to the fitting 76 communicating with the diaphragm chamber 71 through a normally closed solenoid operated valve 104, and the pressurized fluid supply line 95 is a relatively small diameter capillary tube that is connected between the pressure tank 90 and the fitting 78 communicating with the diaphragm chamber 71. It will be understood that with the packet 32 properly positioned in the actuating unit 14 and the lid 21 closed such that the switch 65 (FIG. 13) is actuated and the switch 68 (FIG. 6) remains in its raised normally closed condition, the pump 86 may be actuated in response to pivoting of the operating lever 20 rearwardly against the force of a biasing spring 103 to a position that actuates a switch 105, shown in FIG. 10, such as upon positioning of the cup 12 beneath the nozzle 19.

Actuation of the switch 105 in this case actuates a timer 106, which in turn immediately actuates the pump 86 and opens the valve 104, permitting communication of pressurized fluid through the large diameter supply line 94 into the diaphragm chamber 71 which quickly begins to expand the diaphragm 70 and move the platen 32 to its first or inclined position with the upper end thereof engaging the upper end of the packet 11 (as shown in FIG. 5). Such movement of the platen may take place within a relatively short period, (i.e. less than 2 seconds, and preferably, on the order of 1½ seconds) at which time the timer 106 automatically deactuates and closes the valve 104, while the pump 86 continues to operate. Fluid pressure then continues to be supplied to the diaphragm chamber 71 through the capillary tube 95, but by virtue of its small diameter, a relatively longer period of time, (such as on the order of an additional 4 to 5 seconds) is required to complete expansion of the diaphragm 70 to the point that the platen is pivoted into a fully actuated position pressing against the entire side of the packet, as shown in FIG. 6. The relatively slow movement of the platen 32 under the action of pressurized fluid communicated through the capillary tube 95 enables the more controlled rupturing of the discharge end 25 of the packet and causes the contents to be discharged over a sufficiently long period as to facilitate more thorough mixing of the syrup into the dispensed drink, as will become apparent.

To further facilitate reliable rupturing of the packet and the controlled release of the flavoring syrup therefrom, the discharge end 26 of the packet 11 preferably has a design such as shown in the above identified related application Ser. No. 014,622, filed simultaneously with the present application, the disclosure of which is incorporated herein by reference. The discharge end 26 of the packet 11 is formed with relatively strong permanently sealed areas 110, shown in FIG. 2 in double cross hatched lines, which like the seals about the sides and upper end of the packet, join the walls of the container with a relatively strong permanent bond. The permanently sealed areas 110 at the discharge end of the packet define an unsealed discharge spout 111 on the longitudinal axis of the packet. An arcuate shaped relatively weakly sealed area 112 is formed in surrounding relation about the discharge spout 111 for defining an unsealed chamber communicating with the discharge spout 111. Because of the arcuate shape of the weakly sealed area 112, upon the application of external pressure to the packet 11, the internal pressure build up within the packet will distribute substantially uniformly around the arcuate shaped seal area 112. As a result, greater forces may be employed to effect assured opening of the packet without premature ruturing of the relatively weakly sealed area 112.

For metering the discharge of the contents from the packet upon rupture of the weakly sealed area 112, a relatively strong or permanently sealed diverter area 114 is provided in the unsealed chamber defined by the arcuate shaped seal 112 and the discharge spout 111. The diverter area 114 serves to restrict ballooning of the wall of the container in the area of the discharge spout 111 and tends to meter and control the expulsion of the contents from the packet through the unsealed chamber and discharge spout so as to prevent the sudden surge and forceful discharge of the contents, even when the packet is subjected to relatively high rupturing pressures.

Figure 14:
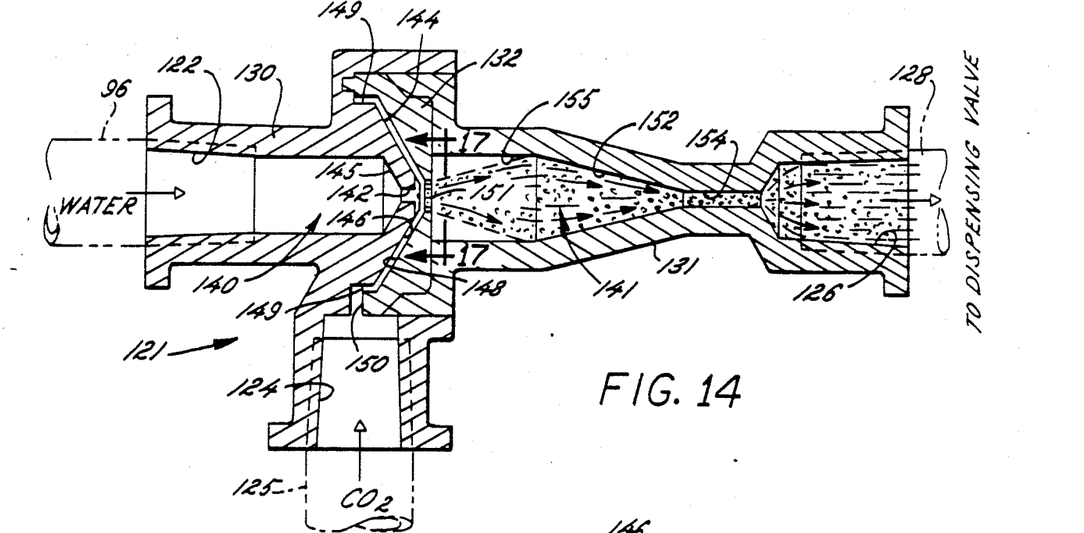
FIG. 14 is an enlarged section of an instantaneous carbonator utilized in the illustrated system for substantially instantaneously carbonating water as it is directed through the system.
Figure 15:
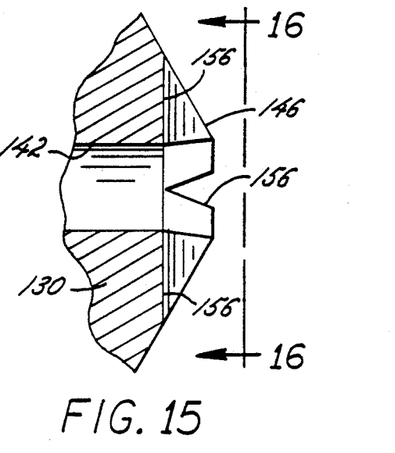
FIG. 15 is an enlarged section of an end portion of one of the carbonator members.
Figure 16:
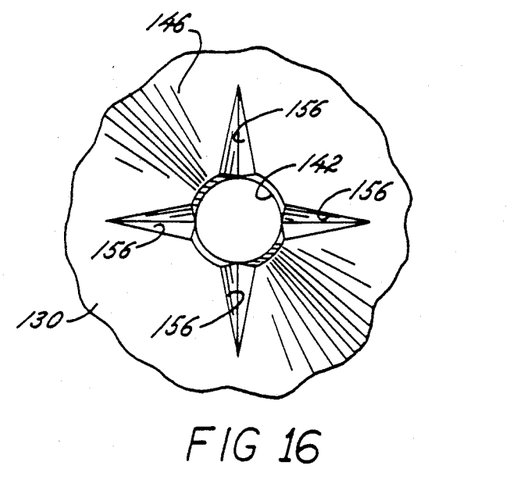
FIG. 16 is a plan view of the tip of the carbonator member shown in FIG. 15, taken in the plane of line 16—16.
Figure 17:
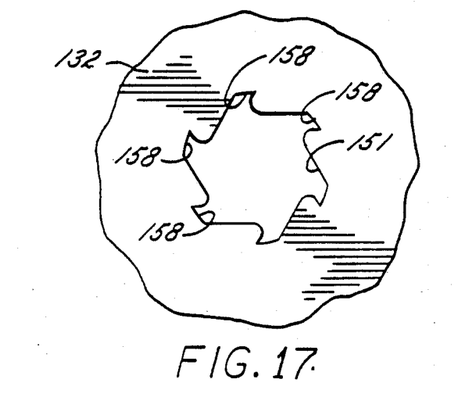
FIG. 17 is an enlarged section of the carbonator taken in the plane of line 17—17 in FIG. 14.

In accordance with another important aspect of the invention, a carbonated water supply system is provided which is adapted to substantially instantaneously carbonate water to commercially acceptable levels simultaneously as it is directed to the discharge nozzle of the actuating unit for mixing with a flavoring syrup as it is being released from a packet. The carbonated water system comprises a cold water supply, in this case being the pressurized water supply line 96 communicating from the pressure tank 90, a carbon dioxide supply, in this case being a supply of $CO_2$ contained in a pressure tank 120, and a carbonator 121 coupled to both the cold water supply and the carbon dioxide supply. The carbonator 121 may be of the type described in my application Ser. No. 724,944, entitled "Instantaneous Carbonator Method and Apparatus", filed Apr. 18, 1985, the disclosure of which is incorporated herein by reference. The illustrated carbonator 121 as shown in FIG. 14, is in the form of an elongated generally cylindrical body having a water inlet port 122 coupled to the pressurized water supply line 96, a carbon dioxide inlet port 124 extending outwardly from one side thereof and coupled to the carbon dioxide pressure tank 120 by a supply line 125, and a carbonated water discharge port 126 connected to a discharge line 128, which in turn communicates with the nozzle 19 through a normally closed solenoid operated valve 129. Flow through the carbonator is controlled by the valve 129, which is actuated by the timer 106 after a predetermined short period, such as 2 seconds, following movement of the operating lever 20 to its actuating position, as will become apparent.

The body of the carbonator 121 in this instance is made of segmented parts or sections for convenience of manufacture, comprising a first body section 130 which defines the water inlet port 122 and the carbon dioxide inlet port 124, a second body member 131 which defines the carbonated water discharge port 126, and an aspirator plate 132 interposed therebetween. The carbonator 121 may be made of any suitable rigid material capable of withstanding the pressures and temperatures involved and which also is acceptable under sanitary codes for use in a carbonated water system. Materials such as plastic and stainless steel which are chemically inert to water, carbon dioxide and carbonic acid are suitable. The body sections 130, 131, 132 may be secured to one another in a suitable manner, such as by an adhesive which has sufficient holding strength and which also is chemically inert to water, carbon dioxide, and carbonic acid.

Water is supplied to the inlet port of the carbonator under controlled temperature and pressure conditions. For this purpose, the by-pass valve 99 may be adjusted to maintain a predetermined pressure higher than atmospheric in the supply line 96 from the pressure tank 90 to the carbonator. By way of illustration, the valve 99 may be set such that the pressure in the supply line 96 is between 90 and 95 pounds per square inch (psi), which is ideal for carbonation. The water in the pressure tank 90 also is refrigerated to a sufficiently low water temperature for satisfactory carbonation, for example, below 40° F., but above freezing, and preferably about 34° F. For maintaining such water temperature, the timer 106 may be set to operate the pump 86 periodically during non-use of the dispensing system to circulate water through the refrigerated pressure tank 90 and reservoir 80. During such water circulation periods, the valves 129, 104 are in their normally closed conditions and the valve 92 in the return line 91 is opened. In practice, it has been found desirable to operate the pump every 7½ minutes for about 30 seconds for circulating the refrigerated water. It will be understood that the cooling apparatus for the pressure tank 90 and reservoir 80 may be of any construction, mechanical or otherwise, which is capable of maintaining the required water temperature and which is acceptable under sanitary codes for a drinking water supply system.

For supplying carbon dioxide to the carbonator at a predetermined pressure, a pressure regulator 135 is interposed in the carbon dioxide supply line 125. The regulator 135 preferably is set to reduce the pressure of the carbon dioxide in the tank 120 to a level about the same as or slightly less than the pressure of the water being supplied to the carbonator inlet port 122. For example, the regulator valve 135 may be set to maintain the carbon dioxide pressure at 2 to 5 psi less than the water pressure. Thus, if the water pressure directed to the carbonator inlet port 122 is maintained at 90 psi, the carbon dioxide pressure in the supply line 125 may be maintained at 85 to 88 psi. It will be understood by one skilled in the art that the water pressure regulator valve 99 and the gas pressure regulator valve 135 may be operatively interrelated in a manner known in the art in order to maintain the 2 to 5 psi pressure differential notwithstanding limited fluctuations in the water pressure and gas supply pressure. A check valve 136 is provided in the water supply line 96 to the carbonator to prevent the flow of gas into such line in the event that the gas pressure should exceed the water pressure. A check valve 138 also is provided in the carbon dioxide supply line 125. The carbon dioxide supply line 125, in the illustrated embodiment is wound about the refrigerated pressure tank 90, so that gas flowing to the carbonator 121 is cooled prior to introduction into the carbonator.

In carrying out the invention, the carbonator includes a gas introduction or aspiration stage 140 in which carbon dioxide is introduced into the flow of water from the water inlet port while the water flow is at a pressure substantially greater than atmospheric pressure and with the inlet pressure of the carbon dioxide gas maintained in a range from substantially the same to slightly less than the pressure fo the flow of the water, and a static pressure-reduction or acceleration stage 141 in which the flow of water and carbon dioxide exiting the aspiration stage is accelerated to provide an abrupt controlled reduction of the static pressure for causing an increase in surface area of the water exposed to the carbon dioxide gas sufficient to achieve substantial absorption of the carbon dioxide gas into the water before the flow reaches the discharge port. The illustrated aspiration stage 140 includes a single, axial water flow or injector passage 142 which is surrounded by a conically shaped, annular gas aspiration passage 144. The water flow passage 142 is connected to the water inlet port 122 by means of a conical transition section 145. The annular gas aspiration passage 144 is formed by a narrow space between the outer surface of a conical protrusion 146 formed at the downstream end of the body section 130 and a complementary conical cavity 148 formed in the aspirator plate 132. Radially outward of the aspiration passage 144, the aspirator plate 132 and protrusion 146 define an annular cavity 149 which communicates with the gas aspiration passage 144 and which also communicates through a radial passage 150 with the gas inlet port 124. Accordingly, carbon dioxide gas is communicated from the gas inlet port 124 through the radial port 150 and into the annular cavity 149, which feeds the gas aspiration passage 144 to provide a supply of carbon dioxide gas in a thin, conically shaped sheet directed radially inwardly about the water flow through the passage 142. The water and gas flows are then directed through a co-axially aligned exit port 151 formed in the aspirator plate 132.

The acceleration or static pressure-reduction stage 141 comprises a pressure reduction chamber having a conical wall 152 which converges in a downstream direction, terminating in a reduced diameter throat or nozzle 154. At its upstream end the conical wall 152 connects with a short cylindrical chamber 155 which communicates with the exit port 151 in the aspirator plate 132. The exit port 151 is of a slightly larger nominal diameter than the water flow passage 142 and is located slightly downstream thereof. In order to enhance the aspiration of gas into the liquid flow stream exiting the water flow passage 151, four notches or grooves 156 are cut across the end of the conical protrusion 146 of the body section 130 in radially extending relation to the water flow passage 142 for increasing the gas flow area and for causing additional turbulence between the gas and liquid. To further increase turbulence, the aspirator exit port 151 has an irregular shape, in this case being formed with a generally saw tooth configuration having a plurality of tips 158 extending in a generally tangential direction, which has the effect of separating the flow streams exiting the aspirator plate exit port 151 into a multiplicity of flow streams.

In operation of the instantaneous carbonator 121, upon opening of the valve 129, water passes from the water inlet port 122 through the water flow passage 142 at an accelerated rate of speed. The exiting jet of water from the water flow passage 142 draws carbon dioxide gas inwardly through the gas supply passage 144 by means of aspiration. In other words, as the water rushes past the gas aspiration passage 144, molecules of gas are entrained by the water, causing gas to flow along with the water. The turbulence of the gas and water flow streams as they pass through the water flow passage 142 and aspirator plate exit port 151 further causes some of the gas molecules to be drawn into partial solution and be absorbed by the water. Thus, by the time the water flow reaches the acceleration or static reduction stage 141 it is partly carbonated.

As the jet of water and partially absorbed carbon dioxide exits the irregular shaped exit port 151 of the aspiration plate 132 and enters the acceleration or static pressure-reduction stage 141, the jet fans out into a multiplicity of streams. These streams merge and accelerate as they approach the throat 154 in that stage. As the combined flow then accelerates in speed it experiences a controlled substantial reduction of static pressure and additional turbulence, which further enhances the aspiration of the gas into the liquid flow stream. Thus, when the flow is ejected from the throat 154 into the carbonated water outlet 126 substantial absorption of the carbon dioxide gas in the water has been achieved.

Figure 18:
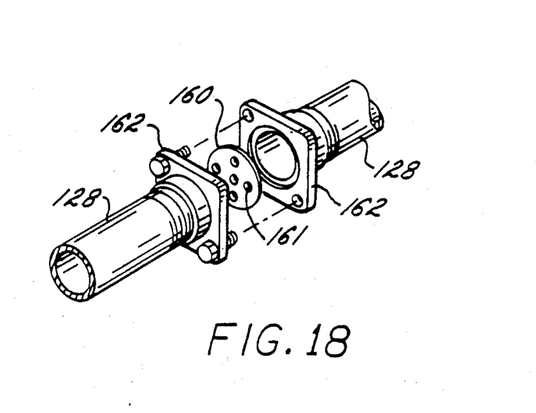
FIG. 18 is a partially diagrammatic perspective of a back pressure control orifice plate interposed in the discharge line of the carbonator in the illustrated system.

For further controlling the reduction in static pressure of the water and absorbed carbon dioxide following acceleration and for enhancing the retention of the absorbed carbon dioxide in the water upon subsequent dispensing to atmospheric pressure, back pressure maintaining means may be interposed in the discharge line 128 downstream of the carbonator 121. In the illustrated embodiment, a back pressure orifice plate or screen 160 is disposed in the discharge line 128 between the carbonator outlet port 126 and the valve 129, as depicted in FIGS. 18 and 19, and is retained in place by suitable fittings 162. The orifice plate 160 preferably defines a plurality of water passageways 161 sized to impede the flow of carbonated water in the discharge conduit 128 upon opening of the valve 129 so as to maintain a back pressure at the outlet 126 of the carbonator that is greater than the reduced pressure of the accelerated water and carbon dioxide in the throat 154, but less than the water pressure at the carbonator inlet 122. Such control in the static pressure drop permits stabilization of the carbon dioxide in the water following acceleration and results in improved retention of the absorbed carbon dioxide in the water upon dispensing to atmospheric pressure. By virtue of such control, the carbonated water stream may be directed into the nozzle 19 of the dispensing system, which is at atmospheric pressure, without undesirable surging and without excessive bubbling or discharge or carbon dioxide into the atmosphere.

A full explanation of the instantaneous carbonation phenomenon is difficult. The theory which has been advanced is that in the acceleration and pressure reduction stage, the water particles suddenly separate or "explode" as they are accelerated with abrupt but controlled reduction of static pressure, which causes rapid intermingling of the resulting extremely fine droplets of water and the previously unabsorbed carbon dioxide, achieving much faster and more complete absorption of carbon dioxide than has heretofore been possible through any other means. With the water being broken down into very tiny droplets as a result of the sudden controlled reduction of static pressure, a maximum surface area is exposed to the previously unabsorbed carbon dioxide which enables substantial absorption thereof in the water. From an external observation of the acceleration or pressure reduction stage of the instantaneous carbonator, it appears that unabsorbed carbon dioxide is suddenly drawn into solution.

It is believed that the instantaneous carbonation phenomenon of the present invention occurs by reason of the specialized application of the Laplace equation to the principles of surface tension and pressure, which establishes that for a spherical droplet of liquid suspended in a gas, the diameter of the droplet varies inversely with the pressure differential internally and externally of the droplet. Thus, as the streams of water and carbon dioxide are joined and accelerated in speed with a substantial and abrupt reduction in static pressure, the droplets of water break into smaller droplets in accordance with the Laplace principle, which greatly increases the surface area in contact with the carbon dioxide. Whatever may be the total explanation, however, the fact remains that following the aspiration stage, the provision of acceleration and abrupt controlled reduction of static pressure achieves substantial instantaneous carbonation of the water to commercially acceptable levels. With the instantaneous carbonator of the present invention, pressurized cold water from the water cooling apparatus can be continuously carbonated upon demand indefinitely as long as the water and carbon dioxide supplies last.

The carbonator 121 may be of relatively small size so as to enable its use in a self-contained beverage dispensing system, such as illustrated. In a practical embodiment of the carbonator, the body may be about 3 inches in length and approximately 1 inch in diameter. The water flow passage 142 is 0.081 inch in diameter. The opposed walls of the protrusion 146 and the cavity 148 are separated by about 0.015 inch so as to define a relatively narrow aspiration passage 144. The irregular shaped aspirator plate exit port 151 may be formed such that the distance across opposed teeth of the port is about 0.089 inches. The diameter of the initial cylindrical portion 155 of the static pressure reduction stage 141 is 0.35 inches, and the angle of the conical wall 151 is approximately 15°. The throat 152 of the pressure reduction stage 174 has a diameter of about 0.081 inch, the same diameter as the water flow nozzle passage 142. The passages 161 of the back pressure orifice plate 160 preferably are sized to maintain a limited back pressure in the discharge conduit 128 downstream of the carbonator. The orifice plate passages 161 preferably define a total flow area adapted for maintaining a pressure at the carbonator outlet port 126 of about 5 to 10 psi less than the water pressure at the carbonator inlet port 122. With a carbonator of such configuration, and with a water temperature of about 34° F., a water inlet pressure in the range of 80 to 85 psi, and a carbon dioxide inlet pressure at substantially the same as or 2 to 5 psi below the water pressure, the carbonator 121 is operable for dispensing carbonated water to satisfying carbonation levels for soft drinks and other beverages.

It will be appreciated that the amount of carbon dioxide entrained and combined with water can be closely controlled. By changing the configuration of the aspiration stage 140, the amount of gas aspirated for a given flow of water can be varied. The change can be accomplished, for example, by increasing or decreasing the size of the liquid flow passage 142 or the gas aspiration passage 144, or both, or by providing additional aspiration passages 144 to connect with the water flow passage 78.

The degree of carbonation can also be altered by altering the physical configuration of the acceleration or static pressure-reduction stage 141, for example, by changing the conical angle leading to the throat 154 or by changing the cross-sectional area of the throat 154. Reductions in conical angle or nozzle area tend to increase the total flow restriction which tends to reduce the volume of carbonated water than can be drawn from the instantaneous carbonator 121 in a given period of time. This can be compensated, for example, by slight enlargement of the carbonated water outlet port 126 or by slightly and proportionately increasing other dimensions. Further control can be effected by varying the amount of back pressuring by the orifice plate 160.

By altering the configuration of the aspirator stage 140 and/or the acceleration or static pressure-reduction stage 141, the total carbonation obtained from the instantaneous carbonator 121, that is, the number of volumes of carbon dioxide forced into chemical combination with a single volume of water, can be closely controlled and altered as desired. Control of the carbon dioxide pressure relative to water inlet pressure, however, is critical. The carbon dioxide pressure should be maintained slightly below the pressure of the water but as close thereto as possible within practical limits. If the carbon dioxide pressure falls below the water inlet pressure by more than about 5 psi, the efficiency of aspiration is reduced. If, on the other hand, the carbon dioxide is closer than about 2 psi to the water inlet pressure, control is very sensitive, and if the carbon dioxide pressure should exceed the water pressure, the flow of the water may be impeded.

In some instances where a lower degree of carbonation may be desired, however, accurate control of reduced carbonation can be achieved by purposely reducing the carbon dioxide pressure to some predetermined value more than 5 psi below the water pressure. This causes a reduction in the amount of gas aspirated but still provides substantial absorption of the aspirated gas by the two stages. If desired, gas pressure differential relative to water pressure can be calibrated for a particular system, thus providing a very accurate means for dispensing carbonated water of varying degrees of carbonation as recommended for use with different kinds of syrup, or to suit individual taste.

The instantaneous carbonator device of the present invention is relatively insensitive to limited changes in volume of water flow, as long as the efficiency of the aspiration stage and the efficiency of the acceleration or static-pressure reduction stage are maintained in the manner indicated above. Thus, the unit can be made larger to dispense larger volumes of carbonated water per unit of time as long as the temperature, water pressure, relative carbon dioxide pressure, and the flow relationship between the aspirator stage and the acceleration or static pressure-reduction stage is maintained.

As in any carbonation system, an increase in water temperature or a decrease in water pressure causes a decrease in the amount of carbon dioxide absorbed by the water. However, in the case of some beverages, reduced carbonation is acceptable, or even desirable, as in the case of diet drinks and fruit drinks, for example. Thus, a simple carbonation system relying upon tap water pressure may be acceptable for home use as long as some reasonable pressure is available, for example, in the neighborhood of 55 psi. The pressure of the carbon dioxide gas should still be maintained slightly below that of the water, but the accuracy of control is not as critical if a lower level of the carbonation is acceptable. Also, for such an inexpensive home system, the water temperature need not be as accurately controlled as long as it is maintained in a range low enough to allow a reasonable level of carbonation for some beverages.

In the illustrated beverage dispensing system, the carbonated water control valve 129 preferably is opened by the timer 106 following the quick action movement of the platen 32 into tilted engagement with a packet 11 in the actuating unit 16, for example, following about 1½ to 2 seconds after actuation of the operating lever 20, so that the flavoring constituent and carbonated water are directed into the nozzle 19 at about the same time. To enhance mixing of the flavoring constituent and the carbonated water together as they are being dispensed, the nozzle 19 in this case has a unique two-part construction. The illustrated nozzle 19, includes an outer nozzle member 165 having an upper generally cylindrical portion and a tapered discharge end. The upper cylindrical portion of the outer nozzle member 165 is supported in a cylindrical chamber 166 in the inner housing member 34 of the actuating unit 16 and is formed with an annular groove 168 about its outer periphery which communicates with a carbonated water supply port 169 formed in the inner housing member 34, which in turn is connected to the carbonator discharge line 128 by a suitable fitting 170 (FIGS. 4–8). A pair of O-rings 171 seal the opposite sides of the annular groove 168. A plurality of circumferentially spaced radial ports 172 communicate from the groove 168 through upper cylindrical portion of the outer nozzle member 165 (FIGS. 7 and 8).

An inner nozzle member 175 having a discharge end located above the level of the discharge end of the outer nozzle member 165 is concentrically supported within the outer nozzle member and is formed with a central flow passageway 176 of gradually narrowing diameter disposed below the packet receiving chamber 30 of the actuating unit 16 such that upon rupturing of a packet in the chamber the contents will be directed into the central flow passageway 176. For permitting communication of carbonated water into the central flow passage 176, the inner nozzle member 175 is formed with a first annular groove 178 about it periphery that communicates with the radial ports 172 of the outer nozzle member, and at least one tangentially oriented port 179 is formed in the inner nozzle member 175 for directing carbonated water from the first annular passageway 178 into the central flow passage 176. A pair of O-rings 180 provide a seal between the inner and outer nozzle members 165, 175 on opposite sides of the first annular groove 178. Carbonated water is directed through the port 179 tangentially into the central flow passageway 176 of the inner nozzle member 175 such that it moves in a swirling direction about the central flow passageway and mixes with flavoring syrup as it simultaneously enters the inner nozzle member and flows downwardly to the discharge end of the inner nozzle member 175. As the mixture of syrup and carbonated water discharge from the inner nozzle member 175, it is mixed with additional carbonated water that takes a circuitous route from the first annular groove 178 through longitudinal ports 184, a second annular groove 185, around an outwardly flared annular rib 186 of the inner nozzle member 175, and then downwardly about the discharge end of the inner nozzle member. Because the flavoring syrup from the packet 11 is directed into the nozzle over a period of time under the slow action movement of the platen 32 of the actuating unit, relatively thorough mixing of the flavoring constituent and carbonated water will result during passage through the nozzle, and upon discharge into the serving cup 12, and such controlled discharge will permit the dispensing of the beverage without extensive foaming.

In order to prevent the flavoring syrup for one drink from contaminating a subsequently dispensed drink of a different flavor, the valve 124 for the carbonated water discharge line 128 may be controlled such that carbonated water is directed into the nozzle for a relatively short period, such as 1 to 2 seconds, after the platen 32 of the actuating unit has moved to its fully actuated position and the contents of the packet have been completely discharged into the nozzle. The swirling movement of the additional carbonated water about the central flow passage 176 will clean the nozzle, thereby preparing it for dispensing of the next drink. Since the additional flow of carbonated water is relatively small, it will not noticeably dilute the upper portion of the dispensed beverage.

To summarize a typical operation of the illustrated beverage dispensing system 10, upon lifting of the lid 21 of the actuating unit 16, a packet 11 with the desired flavoring constituent may be placed into the packet receiving chamber 30 therein while the platen 32 is in an open or retracted position (FIG. 4). With the packet properly positioned in the chamber with an upper sealed end 26 thereof extending above the upper end of the fixed wall 31 of the chamber, upon closing the lid 21 the upper sealed end 26 of the packet will be bent over the upper end of the wall 31 depressing the roller 65' of the switch 65 which, in effect, senses that the lid is closed with a packet in the chamber (FIG. 13). The arm 68' of the switch 68 remains elevated, disposed within the notch of the packet (FIG. 5). The dispensing system is then ready for actuation.

Upon then placing a serving cup 12 under the nozzle 19 and moving of the operating level 20 to its retracted position which actuates switch 105, the timer 106 is actuated, which in turn immediately turns on the pump 86 and opens the valve 104 in the large diameter fluid pressure supply line 94 which permits communication of pressurized fluid to the chamber 71 of the diaphragm 70, resulting in relatively quick action movement (i.e., over a period of about 1½ seconds) of the platen 32 from its open position to a first position engaging the upper end of the packet while in inclined relation thereto (FIG. 5).

At that time, the timer 106 will close the valve 104 for the diaphragm fluid supply line 94 such that only the capillary tube 95 communicates pressurized fluid to the diaphragm chamber 71 so that the platen is pivoted from its first or inclined position (FIG. 5) toward its fully actuated position in a relatively slow and controlled manner. At about the same time the valve 104 for the diaphragm supply line 94 is closed, the timer 106 opens the carbonated water supply valve 129 so as to permit the flow of fresh water and carbon dioxide into and through the carbonator 121, resulting in substantially instantaneous carbonation of the water, which is then directed to the nozzle 121. Thus, as the relatively weakly sealed area 112 at the discharge end 25 of the packet 11 ruptures and the contents thereof are directed into the central flow passage 176 of the nozzle 19 under the slow motion pivotal movement of the platen 32, carbonated water is simultaneously directed into the nozzle so as to mix with the flavoring syrup and then discharge into the cup below the nozzle. The controlled direction of the flavoring syrup and carbonated water into the nozzle over a prolonged period, such as about 4½ seconds, enables the carbonated water and syrup to mix together and be dispensed into the serving cup without extensive foaming. The carbonated water valve 129 is controlled by the timer 106 so as to remain open for a period of about 2 seconds following movement of the platen 32 to its fully actuated position in order to rinse the nozzle of syrup that has been dispensed into the drink. Following such rinsing, and after a total period of about 8 seconds from actuation of the control lever, the timer 106 will close the valve 129 and deactuate the pump 86 to complete the dispensing cycle.

Figure 20:
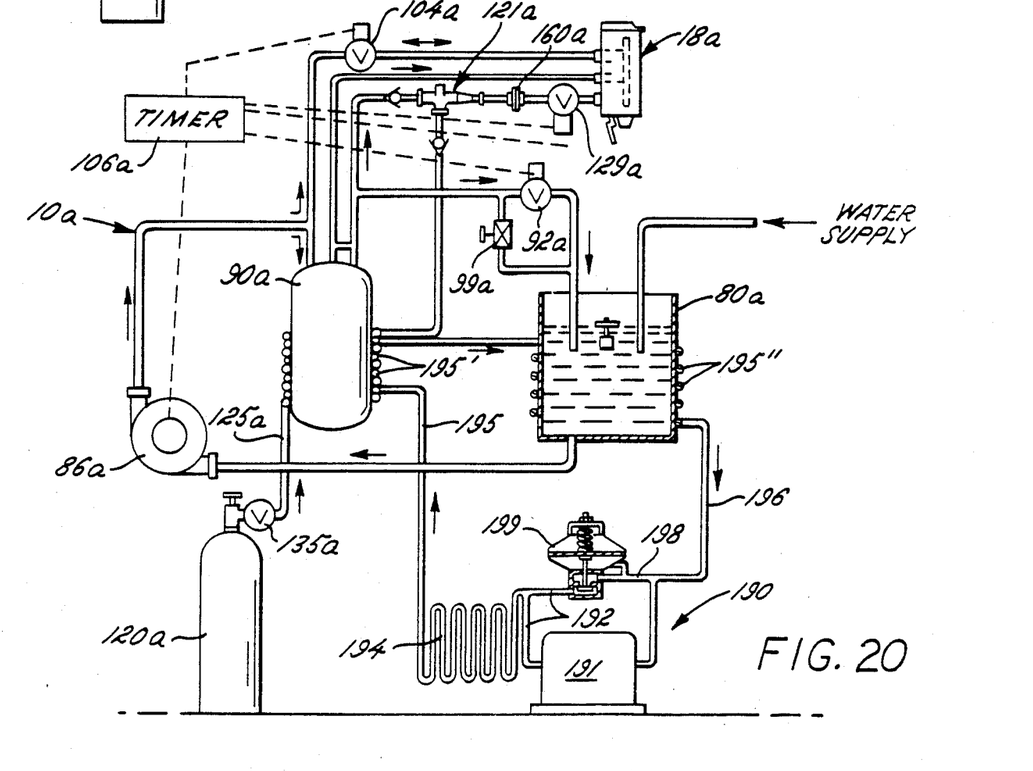
FIG. 20 is a flow diagram of an alternative system according to the present invention.

Referring now to FIG. 20, there is shown a beverage dispensing system 10a similar to that described above, but with a water refrigeration system 190 having means for continuously monitoring and controlling the water temperature. Items similar to those described above have been given similar reference numerals with the distinguishing suffix "a" added. The refrigeration system 190 includes a compressor 191 which communicates through an output line 192 to a condenser 194 which in turn communicates with a cooling coil 195 having a section 195' wrapped around the pressure tank 90a and a section 195" wrapped around the water reservoir 80a. The coil 195 has a return line 196 extending from the reservoir 80a to the compressor 191. The compressor 191 operates in a conventional manner to compress gas to release heat, which is then condensed to liquid form in the condenser 194 and directed through the coil 195 where it warms and evaporates, and then returns to the compressor 191 through the return line for compression and recirculation.

For continuously controlling the desired temperature of the refrigeration cycle and for enhancing its operating efficiency, a bypass line 198 having an expansion valve 199 is coupled in parallel across the compressor 191, in this case being connected between the return line 196 to the compressor and the output line 192 to the condenser 194. The expansion valve 199 may be of a known type, comprising a diaphragm having an underside chamber communicating with the return line 196 and a valve stem for controlling passage of gases through the bypass line 198. The valve 199 may be designed such that as pressure in the diaphragm chamber is increased, the valve is raised closing the bypass line 198. As pressure in the diaphragm chamber is reduced, the valve is drawn downwardly, causing the valve stem to open the bypass line 198.

By appropriate setting of the expansion valve 199 the temperature of the gases in the return line 196 to the compressor 191 can be controlled within preset limits, and accordingly, the temperature of the refrigerant circulated through the coil 195 can be controlled. Hence, with the expansion valve appropriately set, as the temperature of the gas in the return line 196 lowers, the pressure will decrease, drawing the diaphragm of the valve 199 downwardly opening the bypass line 198 such that a portion of the gases in the return line will bypass the compressor 191, thereby increasing the temperature of the refrigerant leaving the condenser 194. As this refrigerant is circulated through the system and the temperature of the gases in the return line 196 increase, the pressure in the return line will increase, raising the diaphragm and moving the valve stem to a position which reduces the passage of gases through the bypass line 198, resulting in lowering the temperature of refrigerant leaving the condenser 194. With such system, it has been found that the compressor and condenser may be operated on a continuous basis to maintain a desired temperature range at the pressure tank 90a and water reservoir 80a without the necessity for repeated starting and stopping of the compressor, which over a prolonged time, can create greater wear and maintenance to such devices.

From the foregoing, it can be seen that the carbonated beverage dispensing system of the present invention is relatively compact in design and lends itself to economical use. The system is adapted to utilize individual serving packets of flavoring constituents and to substantially instantaneously carbonate water as it is being directed to the dispensing nozzle of the system so as to eliminate the need for bulky carbonation tanks and messy containers of flavoring syrups, as heretofore required. Indeed, the carbonated beverage dispensing system of the present invention can be designed to occupy substantially the same amount of space as an ordinary bottled water unit and can be used at only slightly greater cost than such conventional bottled water units.

I claim as my invention:

1. A sealed container for use in a beverage dispensing system having an actuating unit for applying a rupturing pressure to said container for dispensing a substance packaged therein, said container comprising walls of flexible material having mating peripheral edges, means forming a seal along a marginal area of said edges to define a fluid-tight internal packaging compartment, said marginal area seal including relatively strong permanently sealed areas which define an unsealed discharge spout, and an arcuate shaped sealed area surrounding said discharge spout for defining an unsealed chamber communicating with said discharge spout, whereby upon application of predetermined external pressure to the container by a beverage dispensing system actuating unit said arcuate sealed area will rupture to permit the controlled discharge of the packaged substance through said unsealed chamber and discharge spout.

2. The container of claim 1 in which said relatively strong permanently sealed areas are formed with a pattern of indentations for enhancing the bond between the walls of the flexible sheet material for providing said areas with a degree of form retaining rigidity.

3. The container of claim 2 in which said relatively strong permanently sealed areas define said discharge spout on the longitudinal axis of said container at a lower end thereof, and said relatively strong permanently sealed areas extend laterally from said discharge spout across the lower end of said container.

4. The container of claim 3 in which said relatively strong permanently sealed areas extend the length of the sides of said container and across the upper end thereof.

5. The container of claim 4 in which said relatively strong permanently sealed areas are formed with at least one container locating cutout section.

6. The container of claim 5 in which said relatively strong permanently sealed areas are formed with container locating cutout sections at each of the opposed bottom corners.

7. The container of claim 1 in which said arcuate shaped sealed area has a curvilinear side defining a portion of the perimeter of said internal compartment and extending inwardly into said compartment from said marginal permanently sealed area.

8. The container of claim 7 in which said curvilinear side of said arcuate sealed area defines a central lower perimeter of said internal compartment.

9. The container of claim 8 in which said arcuate sealed area has a curvilinear lower side that defines an upper side of said unsealed chamber.

10. The container of claim 1 in which said arcuate sealed area is formed with a relatively weak seal as compared to said permanently sealed areas that define said discharge spout.

11. The container of claim 1 in which said discharge spout has a relatively narrow width spout section extending inwardly from the peripheral edge of said container and an outwardly flared flow channelling section extending inwardly therefrom.

12. A sealed container for use in a beverage dispensing system having an actuating unit for applying a rupturing pressure to said container for dispensing a substance packaged therein, said container comprising walls of flexible material having mating peripheral edges, means forming a seal along a marginal area of said edges to define a fluid-tight internal packaging compartment, said marginal area seal including relatively strong permanently sealed areas which define an unsealed discharge spout, a relatively weakly sealed area sealing the discharge spout from the internal packaging compartment, said weakly sealed area extending inwardly into said compartment from said marginal area seal, whereby on the application of predetermined external pressure to the container by a beverage dispensing system actuating unit, said weakly sealed area ruptures to permit the controlled discharge of the packaged substance through said discharge spout.

13. The container of claim 12 in which one side of said weakly sealed area has an arcuate shape with a curvilinear upper side that defines a central lower perimeter of said internal compartment.

14. The container of claim 13 in which said weakly sealed arcuate shaped area has a lower curvilinear side that defines an upper side of said unsealed chamber.

15. The container of claim 12 in which said discharge spout has a relatively narrow width spout section extending inwardly from the peripheral edge of said container and an outwardly flared flow channelling section extending inwardly therefrom.

16. A sealed container for use in a beverage dispensing system having an actuating unit for applying a rupturing pressure to said container for dispensing a substance packaged therein, said container comprising walls of flexible material having mating peripheral edges, means forming a seal along a marginal area of said edges to define a fluid-tight internal packaging compartment, said marginal area seal defining an unsealed discharge spout, an arcuate shaped sealed area surrounding said discharge spout for closing said internal compartment from said discharge spout and for defining an unsealed chamber communicating with said discharge spout, said arcuate shaped sealed area having a first curvilinear side that extends inwardly into said compartment from said marginal area seal and defines a portion of the lower perimeter of said compartment and a second curvilinear side that defines an upper perimeter of said unsealed chamber, whereby upon application of predetermined external pressure to the container by a beverage dispensing system actuating unit, said arcuate shaped sealed area will rupture to permit the controlled discharge of the packaged substance through said unsealed chamber and discharge spout.

* * * * *